(12) United States Patent
Schachtrup et al.

(10) Patent No.: US 7,299,931 B2
(45) Date of Patent: Nov. 27, 2007

(54) LIQUID FILTER COMPRISING AIR VENTS

(75) Inventors: Ludger Schachtrup, Münster (DE); Andreas Reuter, Münster (DE)

(73) Assignee: Hengst GmbH & Co. KG, Muenster (DE)

( * ) Notice: Subject to any disclaimer, the term of this patent is extended or adjusted under 35 U.S.C. 154(b) by 296 days.

(21) Appl. No.: 10/470,709

(22) PCT Filed: Jan. 24, 2002

(86) PCT No.: PCT/DE02/00233

§ 371 (c)(1),
(2), (4) Date: Aug. 27, 2003

(87) PCT Pub. No.: WO02/061264

PCT Pub. Date: Aug. 8, 2002

(65) Prior Publication Data

US 2004/0099587 A1    May 27, 2004

(30) Foreign Application Priority Data

Jan. 31, 2001    (DE) .......................... 201 01 572 U

(51) Int. Cl.
*B01D 36/00* (2006.01)
(52) U.S. Cl. .................................................... 210/436
(58) Field of Classification Search ............... 210/115, 210/120
See application file for complete search history.

(56) References Cited

U.S. PATENT DOCUMENTS

| | | | | |
|---|---|---|---|---|
| 2,007,336 A | * | 7/1935 | Malivert ..................... | 210/436 |
| 2,811,220 A | * | 10/1957 | Winslow ..................... | 96/178 |
| 3,786,618 A | * | 1/1974 | Sommerfeld et al. ......... | 96/179 |
| 4,619,764 A | * | 10/1986 | Church et al. ............... | 210/248 |
| 5,017,285 A | * | 5/1991 | Janik et al. .................. | 210/232 |
| 5,462,658 A | | 10/1995 | Sem | |

FOREIGN PATENT DOCUMENTS

| | | |
|---|---|---|
| DE | 4014551 | 12/1991 |
| DE | 19519352 | 11/1996 |
| DE | 19602082 | 7/1997 |
| DE | 19716085 | 10/1998 |
| DE | 19934378 | 1/2001 |
| WO | 90/11444 | 10/1990 |
| WO | 01/07141 | 2/2001 |

* cited by examiner

*Primary Examiner*—Terry K Cecil
(74) *Attorney, Agent, or Firm*—Greenblum & Bernstein, P.L.C.

(57) ABSTRACT

Liquid filter for a motor vehicle and method of venting the filter. The filter includes a venting arrangement adapted to vent air displaced from a filter. The venting arrangement has a first vent nozzle and a second vent nozzle. The first and second vent nozzles are arranged in series along an air flow direction. The first and second vent nozzles provide flow resistance to liquid flow. The method of venting includes arranging the first vent nozzle above the second vent nozzle and spacing the first and second vent nozzles from each other to provide greater resistance to fuel flow than to air flow. This abstract is not intended to define the invention disclosed in the specification, nor intended to limit the scope of the invention in any way.

30 Claims, 1 Drawing Sheet

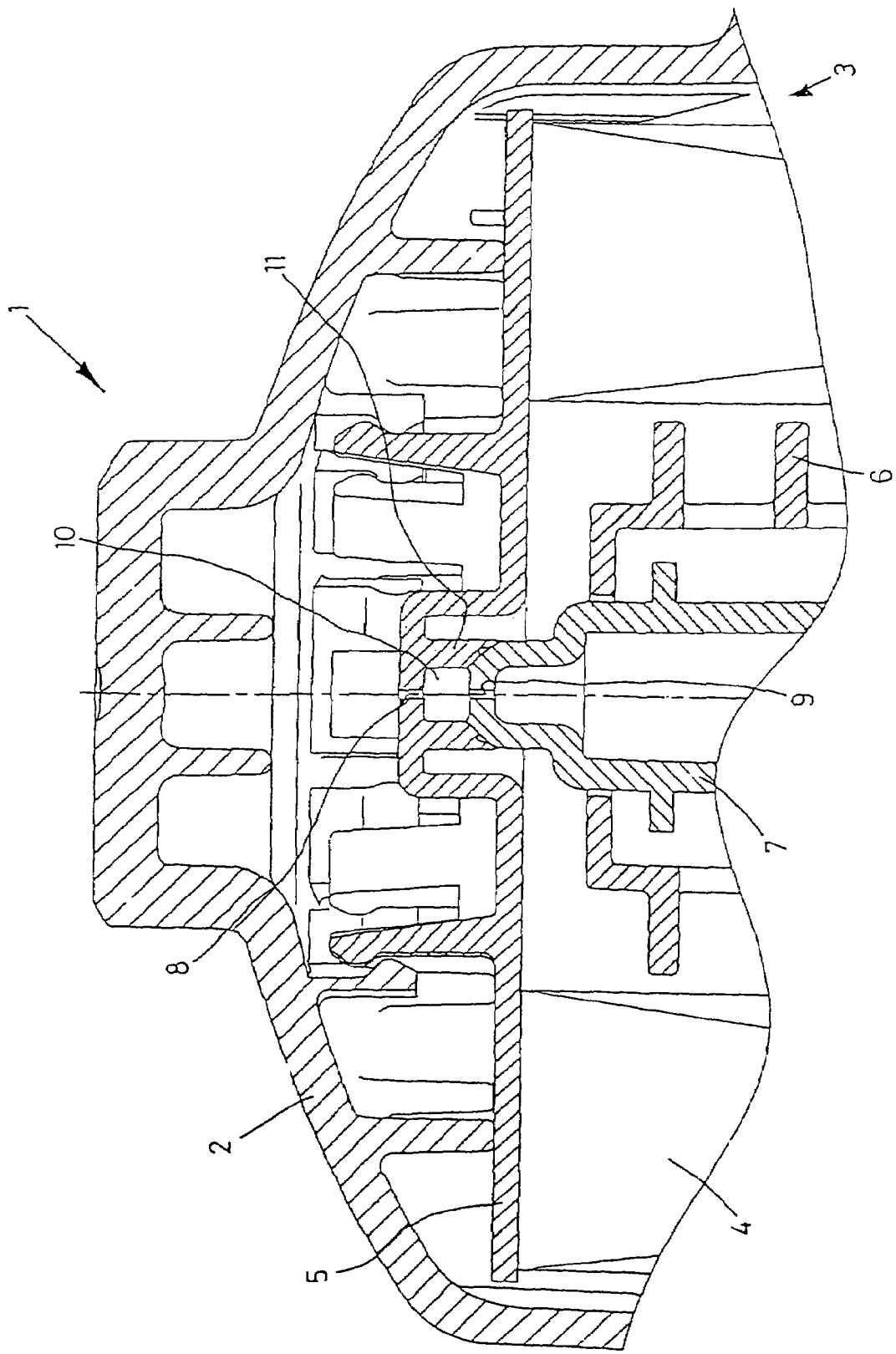

LIQUID FILTER COMPRISING AIR VENTS

The present application is a National Stage Application of International Application No. PCT/DE02/00233, filed Jan. 24, 2002. Further, the present application claims priority under 35 U.S.C. § 119 of German Patent Application No. 201 01 572.2 filed on Jan. 31, 2001.

BACKGROUND OF THE INVENTION

1. Field of the Invention

The invention relates to a liquid filter according. The invention also relates to a fuel filter for an internal combustion engine having a venting arrangement for air displaced from the filter with increasing liquid volume.

2. Discussion of Background Information

A generic filter is known from DE 195 19 352 C2. When it is used, e.g., as a fuel filter for diesel fuel, air bubbles that could be conveyed to the engine are to be avoided. For this reason venting is provided in the liquid filter. Through this venting, and in particular through the bore thereby provided which is also termed a vent nozzle, a permanent loss volume flow of fuel results, which is conveyed directly back into the tank together with the air bubbles. In practice, e.g., bores with diameters of 0.7 mm are usual. However, the loss volume flow passing through these comparatively large bores should be as low as possible.

SUMMARY OF THE INVENTION

The invention aims to improve a generic liquid filter so that the loss volume flow is as low as possible with reliable venting, whereby a reliable retention of the venting function is ensured and the production of the liquid filter can be carried out as cost-effectively as possible.

The invention is also directed to a liquid filter for motor vehicles, such as a fuel filter for an internal combustion engine, which comprises a venting arrangement for the air displaced from the filter with increasing liquid volume, whereby the venting arrangement features a bore that features a low resistance to air and a great resistance to liquid, characterized in that a second such bore is provided, whereby the two bores are arranged in series in the flow direction of the air.

In other words, the invention proposes arranging and/or connecting two vent nozzles in series, i.e., to provide two bores that are arranged in series in the flow direction of the air bubbles or of the fuel loss flow. An increased resistance for the liquid thus results compared with the use of only one vent nozzle of the same size. When only one vent nozzle is used, this increased resistance could be achieved by a reduced diameter of the bore; however, this can be expensive in terms of manufacturing technology and in addition can involve the risk of the particularly small bore clogging quickly, so that the venting function is no longer performed. The two bores can be advantageously produced according to the present invention by the manufacturing method hitherto used.

Partly contradictory objectives are thus achieved with the invention: firstly, an easy fabrication, since mandrels can be used in injection mold tools which have the comparatively large diameter of the bore to be produced and which are correspondingly stable and resistant to breakage; secondly, the comparatively large diameter of the bores provides a safeguard against clogging during the operation of the filter, and thirdly, despite the comparatively large diameter of the individual bores, the desired higher flow resistance for the liquid is achieved.

An expansion chamber can be advantageously provided between the two bores, which chamber features a considerably larger cross section than the two bores. Through this expansion chamber the effect of a bore resulting with a particularly long length is avoided, so that the resistance to clogging of the vent nozzle arrangement is improved and the ease of fabrication facilitated by this, too. In addition, if necessary, the flow resistance can be influenced, namely increased, by way of a flow deflection or swirling within the expansion chamber.

Advantageously, the invention also contemplates providing one of the two bores on a removable filter component and the other of the two bores on a fixed filter component. Through this distribution and/or arrangement of the bores on both fixed and removable components of the filter, it is possible simply and cost-effectively to arrange the two bores in series in the flow direction within the scope of the assembly of the filter which takes place anyway. With a conventional embodiment of a liquid filter such as, e.g., the generic filter, the invention contemplates a modification thereof wherein one bore can be provided in the end plate of the filter element and the other bore at the air-vent pipe.

Naturally, the invention also contemplates the use of more than the aforementioned two bores. A kind of "nozzle section," for instance, can thus be made up of several bores, e.g., of any number of conical and cup-shaped components arranged in series that can be fitted into one another and that each feature the bore in the "cup base" and that can be connected to one another, e.g., swaged, adhered or welded. The entire nozzle section can be subsequently installed in the filter.

The invention also provides for a liquid filter for a motor vehicle comprising a venting arrangement adapted to vent air displaced from a filter. The venting arrangement comprises a first vent nozzle and a second vent nozzle. The first and second vent nozzles are arranged in series along an air flow direction. The first and second vent nozzles provide flow resistance to liquid flow.

The liquid filter may be a fuel filter for an internal combustion engine. The venting arrangement may vent air displaced from a filter when the filter experiences increased liquid volume. The venting arrangement may provide greater resistance to liquid flow than to air flow. The first vent nozzle may provide greater resistance to liquid flow than to air flow.

The filter may further comprise an expansion chamber arranged between the first and second vent nozzles. Each of the first and second vent nozzles may comprise an opening and the expansion chamber may comprise a cross-section which is larger than a cross-section of the openings of the first and second vent nozzles.

Each of the first and second vent nozzles may comprise an opening, wherein the openings are spaced apart from each other, and the filter may further comprise an expansion chamber communicating with the openings of the first and second vent nozzles.

The first vent nozzle may be arranged on a removable filter element. The removable filter element may comprise an end plate. The first vent nozzle may be arranged on the end plate.

The second vent nozzle may be arranged on a fixed filter component. The fixed filter component may comprise a support dome. The second vent nozzle may be arranged on the support dome. The support dome may support a filter medium of a ring-shaped filter element. The support dome may be arranged on an inside of a filter medium.

The invention also provides for a fuel filter for a motor vehicle comprising a venting arrangement adapted to vent air. The venting arrangement comprises a plurality of vent nozzles arranged in series. Each of the plurality of vent nozzles may comprise a through opening and may be spaced apart from one another.

The invention still further provides for a fuel filter for a motor vehicle comprising a filter element. A first vent nozzle is arranged above the filter element and comprises a first through opening. A second vent nozzle is arranged below the first vent nozzle and above the filter element and comprises a second through opening. An expansion chamber is arranged between the first and second vent nozzles.

The first and second vent nozzles may be axially aligned with one another and spaced apart from one another. The fuel filter may vent air when the fuel filter experiences increased liquid volume. The first and second vent nozzles may provide greater resistance to liquid flow than to air flow. The expansion chamber may comprise a cross-section which is larger than a cross-section of the first and second through openings. The first and second through openings may be spaced apart from each other, and the expansion chamber may communicate with the first and second through openings. The filter element may comprise a removable filter element and the first vent nozzle may be arranged on the removable filter element. The removable filter element may comprise an end plate. The first vent nozzle may be arranged on the end plate. The second vent nozzle may be arranged on a support dome. The support dome may support the filter element. The support dome may be arranged on an inside of the filter element.

The invention also provides for a method of venting air while filtering fuel with the liquid filter of the type described above, wherein the method comprises allowing air and fuel to flow above the first and second vent nozzles and passing the fuel and the air through the first and second through openings and through the expansion chamber, wherein the passing provides greater resistance to fuel flow than to air flow.

The invention also provides for a method of venting air while filtering fuel with the fuel filter of the type described above wherein the method comprises arranging the first vent nozzle above the second vent nozzle and spacing the first and second vent nozzles from each other to provide greater resistance to fuel flow than to air flow.

The invention also provides for a method of venting air while filtering fuel with the filter of type described above wherein the method comprises arranging one of the plurality of vent nozzles above another of the plurality of vent nozzles and spacing the plurality of vent nozzles from each other to provide greater resistance to fuel flow than to air flow.

BRIEF DESCRIPTION OF THE DRAWINGS

An exemplary embodiment of the innovation is described in more detail below on the basis of the drawing wherein:

The sole FIGURE shows a partial section view a liquid filter.

DETAILED DESCRIPTION OF THE PREFERRED EMBODIMENTS

In general, the invention relates to a liquid filter 1. The liquid filter 1 is shown only in section. The filter 1 can be embodied as a fuel filter for a vehicle with an internal combustion engine. The liquid filter 1 features a cover 2 that can be screwed onto a filter housing (not shown). After the cover 2 is removed, a filter element 3 can be replaced. The filter element 3 comprises only three components, i.e., a filter medium 4, e.g., in the form of a paper folded filter, and two end plates made of plastic, of which only the upper end plate 5 is shown in the drawing.

In order to support the filter medium 4 during operation, when it is possibly softened, a support dome 6 is provided and/or arranged in the interior of the filter element 3. The filter medium 4 can rest on the support dome 6 during operation of the filter 1. The fuel to be filtered passes from the radial outside position of the filter medium 4 to the radial inside position of the filter medium and through the filter medium 4. There, in the radial inside position, the fuel reaches the clean side of the filter 1 and can then flow off downwards. An air-vent pipe 7 is provided and/or arranged on this clean side of the filter 1, namely inside the support dome 6. Through the air-vent pipe 7 a loss flow constantly flows back into the fuel tank. From the raw side of the filter 1, i.e., from an outside of the filter element 3, fuel can pass between cover 2 and plate 5 and through a first opening or bore 8, which is provided in the upper end plate 5 of the filter element 3. The fuel can then subsequently pass through a second opening or bore 9 that is provided in the upper front wall of the air-vent pipe 7. An expansion chamber 10 is located and/or provided between the two bores 8 and 9.

The two bores 8 and 9 are thus arranged in series. The expansion chamber 10 arranged the two bores 8 and 9 features a considerably larger cross section than the two bores 8 and 9. By utilizing the expansion chamber 10 the resistance to clogging of the vent nozzle arrangement is improved. Such an arrangement is also more easily fabricated. In addition, if necessary, the flow resistance can be influenced, namely increased, by way of a flow deflection or swirling within the expansion chamber 10.

A collar 11 is provided and/or arranged on the upper end plate 5 between the upper end plate 5 and the front end of the air-vent pipe 7. The collar 11 features a sealing contour on its underside where it rests on the air-vent pipe 7. In this way a liquid-tight connection between the upper end plate 5 and the air-vent pipe 7 is guaranteed here.

Unlike the exemplary embodiment shown, the invention also contemplates the use of more than two bores connected in series.

The invention claimed is:

1. A liquid filter for a motor vehicle comprising:
   a support member arranged in an interior of a removable filter medium;
   a venting arrangement adapted to vent air;
   the venting arrangement comprising a first vent nozzle arranged in an end plate and a second vent nozzle arranged in the support member;
   the end plate covering an end of the filter medium and being removable with the filter medium from the support member; and
   the first and second vent nozzles being arranged adjacent the end of the filter medium and in series along an air flow direction,
   wherein the first and second vent nozzles provide flow resistance to liquid flow.

2. The filter of claim 1, wherein the liquid filter is a fuel filter for an internal combustion engine.

3. The filter of claim 1, wherein the venting arrangement vents air when the filter experiences increased liquid volume.

4. The filter of claim 1, wherein the venting arrangement provides greater resistance to liquid flow than to air flow.

5. The filter of claim 1, wherein the first vent nozzle provides greater resistance to liquid flow than to air flow.

6. The filter of claim 1, further comprising an expansion chamber arranged between the first and second vent nozzles.

7. The filter of claim 6, wherein each of the first and second vent nozzles comprise an opening and wherein the expansion chamber comprises a cross-section which is larger than a cross-section of the openings of the first and second vent nozzles.

8. The filter of claim 1, wherein each of the first and second vent nozzles comprise an opening, wherein the openings are axially aligned and spaced apart from each other, and further comprising an expansion chamber communicating with the openings of the first and second vent nozzles.

9. The filter of claim 1, wherein the end plate comprises a collar which forms a liquid-tight connection with an end of an air-vent pipe located in an interior of the support member.

10. The filter of claim 9, wherein the end plate is made of plastic.

11. The filter of claim 1, wherein the second vent nozzle is arranged on a fixed filter component.

12. The filter of claim 11, wherein the fixed filter component comprises the support member.

13. The filter of claim 12, wherein the support member comprises a support dome.

14. The filter of claim 13, wherein the support dome supports the filter medium of a ring-shaped filter element.

15. The filter of claim 1, wherein the end plate comprises a collar which forms a liquid-tight connection with an end of an air-vent pipe located in an interior of the support member, whereby an area between the first vent nozzle and the second vent nozzle is surrounded by the collar and forms an expansion chamber.

16. The filter of claim 1, wherein the end plate is a plastic member located at one end of the filter medium, wherein the second vent nozzle is arranged on an end of an air vent pipe located in an interior of the support member, and wherein the first and second vent nozzles comprise axially aligned through openings.

17. A method of venting air while filtering fuel with the liquid filter of claim 1, the method comprising:
arranging the first vent nozzle above the second vent nozzle; and
spacing the first and second vent nozzles from each other to provide greater resistance to fuel flow than to air flow.

18. A fuel filter for a motor vehicle comprising:
an end plate covering one end of a removable filter medium;
the end plate being removable with the filter medium from an air vent pipe arranged in an interior of the filter medium;
a cover connectable to at least one of a filter housing and the end plate;
a venting arrangement adapted to vent air;
the venting arrangement comprising a plurality of vent nozzles arranged in series and separated by an expansion chamber;
the plurality of vent nozzles being arranged adjacent the one end of the filter medium, and each of the plurality of vent nozzles comprising a through opening and being spaced apart from one another;
one of the plurality of vent nozzles being arranged in the end plate and another of the plurality of vent nozzles being arranged in an end of the air vent pipe.

19. The filter of claim 18, wherein the through openings of the plurality of vent nozzles are axially aligned.

20. A method of venting air while filtering fuel with the fuel filter of claim 18, the method comprising:
arranging one of the plurality of vent nozzles above another of the plurality of vent nozzles; and
spacing the plurality of vent nozzles from each other to provide greater resistance to fuel flow than to air flow.

21. A fuel filter for a motor vehicle comprising:
a replaceable filter element;
an end plate covering one end of the filter element;
the end plate is part of the filter element;
a support dome located in an interior of the filter element;
an air vent pipe located in an interior of the support dome;
the filter element and the end plate being removable from the support dome and the air vent pipe;
a first vent nozzle arranged in the end plate above and adjacent the one end of the filter element and comprising a first through opening;
a second vent nozzle arranged in the air vent pipe below the first vent nozzle, adjacent the one end of the filter medium, and above the filter element, the second vent nozzle comprising a second through opening; and
an expansion chamber arranged between the first and second vent nozzles.

22. The filter of claim 21, wherein the first and second vent nozzles are axially aligned with one another and spaced apart from one another.

23. The filter of claim 21, wherein the fuel filter vents air when the fuel filter experiences increased liquid volume.

24. The filter of claim 21, wherein the first and second vent nozzles provide greater resistance to liquid flow than to air flow.

25. The filter of claim 21, wherein the expansion chamber comprises a cross-section which is larger than a cross-section of the first and second through openings.

26. The filter of claim 21, wherein the first and second through openings are spaced apart from each other, and wherein the expansion chamber communicates with the first and second through openings.

27. The filter of claim 21, wherein the first vent nozzle is arranged on the end plate.

28. The filter of claim 27, wherein the end plate comprises a collar.

29. The filter of claim 22, wherein the support dome supports the filter element.

30. A method of venting air while filtering fuel with the fuel filter of claim 21, the method comprising:
allowing air and fuel to flow above the first and second vent nozzles; and
passing the fuel and the air through the first and second through openings and through the expansion chamber, wherein the passing provides greater resistance to fuel flow than to air flow.

* * * * *